United States Patent
Forzley

(10) Patent No.: US 8,566,237 B2
(45) Date of Patent: Oct. 22, 2013

(54) INTERNET PAYMENT SYSTEM AND METHOD

(75) Inventor: Marwan Forzley, Ottawa (CA)

(73) Assignee: Western Union Financial Services, Inc., Englewood, CO (US)

( * ) Notice: Subject to any disclaimer, the term of this patent is extended or adjusted under 35 U.S.C. 154(b) by 428 days.

(21) Appl. No.: 12/016,647

(22) Filed: Jan. 18, 2008

(65) Prior Publication Data

US 2008/0114657 A1    May 15, 2008

Related U.S. Application Data

(63) Continuation of application No. 10/697,984, filed on Oct. 31, 2003, now abandoned.

(60) Provisional application No. 60/422,640, filed on Nov. 1, 2002, provisional application No. 60/506,873, filed on Sep. 30, 2003.

(51) Int. Cl.
    *G06Q 40/00*            (2012.01)

(52) U.S. Cl.
    USPC ........ 705/40; 705/4; 705/26; 705/39; 705/42; 705/44; 709/206; 709/225; 709/227; 713/172; 713/200; 379/114.2; 345/156

(58) Field of Classification Search
    USPC .......... 705/4, 26, 39, 40, 42, 44, 75; 709/206, 709/225, 227; 713/172, 200; 379/114.2; 345/156
    See application file for complete search history.

(56) References Cited

U.S. PATENT DOCUMENTS

| | | | |
|---|---|---|---|
| 5,420,606 A * | 5/1995 | Begum et al. | 345/156 |
| 6,381,582 B1 | 4/2002 | Walker et al. | |
| 6,502,747 B1 | 1/2003 | Stoutenburg et al. | |
| 6,629,081 B1 | 9/2003 | Cornelius et al. | |
| 7,051,002 B2 | 5/2006 | Keresman, III et al. | |
| 7,249,069 B2 | 7/2007 | Alie et al. | |
| 7,499,875 B1 | 3/2009 | May et al. | |
| 7,593,893 B1 | 9/2009 | Ladd et al. | |
| 2001/0019604 A1 * | 9/2001 | Joyce et al. | 379/114.2 |
| 2002/0029248 A1 * | 3/2002 | Cook et al. | 709/206 |
| 2002/0029269 A1 * | 3/2002 | McCarty et al. | 709/225 |
| 2002/0035489 A1 * | 3/2002 | Herman et al. | 705/4 |
| 2002/0049670 A1 | 4/2002 | Moritsu et al. | |
| 2002/0059430 A1 * | 5/2002 | Orbke et al. | 709/227 |

(Continued)

FOREIGN PATENT DOCUMENTS

| WO | 9966436 A1 | 12/1999 |
|---|---|---|
| WO | 0109756 A3 | 2/2001 |

*Primary Examiner* — James Trammell
*Assistant Examiner* — Sanjeev Malhotra
(74) *Attorney, Agent, or Firm* — Kilpatrick Townsend & Stockton LLP

(57) ABSTRACT

A system and method for facilitating payment for online purchases is disclosed. The system allows consumers/customers who shop online to select, at the time of checkout, direct payment from an account as the payment option. An electronic bill (ebill), independent of any confidential financial information pertaining to the consumer, is automatically displayed and emailed to the consumer. The consumer pays the ebill at their bank the same way they pay their utility bill, which then results in a payment confirmation sent from the bank to the payee. Payment information from the bank is sent to the system to update the purchase transactions. Once the payment information is processed, the consumer and merchant accounts are balanced and both receive automatic notification of the payment.

20 Claims, 8 Drawing Sheets

(56) References Cited

U.S. PATENT DOCUMENTS

| | | |
|---|---|---|
| 2002/0099618 A1* | 7/2002 | Stiberman ............... 705/26 |
| 2002/0161707 A1* | 10/2002 | Cole et al. ............... 705/42 |
| 2003/0004834 A1* | 1/2003 | Yamazaki ............... 705/26 |
| 2003/0046237 A1* | 3/2003 | Uberti ............... 705/44 |
| 2003/0126094 A1* | 7/2003 | Fisher et al. ............... 705/75 |
| 2003/0140004 A1* | 7/2003 | O'Leary et al. ............... 705/39 |
| 2003/0145205 A1* | 7/2003 | Sarcanin ............... 713/172 |
| 2003/0220835 A1 | 11/2003 | Barnes |
| 2004/0059688 A1 | 3/2004 | Dominguez et al. |
| 2004/0064407 A1* | 4/2004 | Kight et al. ............... 705/40 |
| 2004/0107146 A1 | 6/2004 | Alfano |
| 2004/0172552 A1* | 9/2004 | Boyles et al. ............... 713/200 |
| 2004/0254849 A1 | 12/2004 | Brocke-Benz |
| 2004/0260657 A1 | 12/2004 | Cockerham |
| 2005/0038707 A1 | 2/2005 | Roever et al. |
| 2005/0038738 A1 | 2/2005 | Peck et al. |
| 2005/0065883 A1* | 3/2005 | Dent et al. ............... 705/40 |
| 2005/0097320 A1 | 5/2005 | Golan et al. |
| 2005/0187878 A1 | 8/2005 | Khaishgi et al. |
| 2006/0282382 A1 | 12/2006 | Balasubramanian et al. |
| 2007/0174189 A1 | 7/2007 | Bishop et al. |
| 2008/0021803 A1 | 1/2008 | Ahles et al. |
| 2008/0140568 A1 | 6/2008 | Henry |
| 2008/0281726 A1 | 11/2008 | Gupta |
| 2009/0150299 A1 | 6/2009 | Moscal et al. |
| 2010/0274723 A1 | 10/2010 | Joao |

* cited by examiner

INTERNET PAYMENT SYSTEM AND METHOD

CROSS-REFERENCE TO RELATED APPLICATIONS

This application is continuation-in-part of U.S. patent application Ser. No. 10/697,984, filed on Oct. 31, 2003, which is related to U.S. Provisional Patent Application No. 60/422,640 filed on Nov. 1, 2002 and U.S. Provisional Patent Application No. 60/506,873 filed on Sep. 30, 2003.

FIELD OF THE INVENTION

The present invention relates to an Internet payment system and method.

BACKGROUND OF THE INVENTION

Currently users who have purchased goods and services over the Internet are faced with few payment options. The credit card companies dominate the market, while the users pay high processing fees and shy away from making online payments for trust and security reasons. Digital cash has lower rates than credit card companies, but the adoption has been slow and there are no turnkey solutions still in place.

Some problems of the current methods include credit card fraud that deters users from using their credit card numbers on the web; high cost of processing that deters merchants from setting up eCommerce sites; and inability to buy items from multiple merchants with one payment transaction that makes the process cumbersome.

SUMMARY OF THE INVENTION

An object of the present invention is to provide an improved Internet payment system and method.

A payment method and system are provided using electronic media and in particular the Internet to allow a secure and trusted exchange of money, to broaden the choices of users and allow merchants to receive payment using means other than credit cards and digital cash, to reduce the cost of electronic transactions for both user and merchant and to allow users to make payment for multiple merchants using a single account.

The Internet Debit Manager (IDM) functions as a payment processing infrastructure that processes online purchases completed by buyers via web banking, telebanking and mobile banking. The present invention supports purchase processing, payment processing, as well as service provider and merchant tools. The system is able to clear and settle funds for both the buyers as well as merchants participating in transactions.

The system enables secure confidential debit payment for goods and services purchased over the Internet. The system has flexible payment handling and supports payment flow from the bank to the service provider to the merchant or directly from the bank to the merchant.

The system allows consumers who shop online to select, at the time of checkout, direct payment from an account as the payment option. A bill is automatically displayed and emailed to the consumer. The consumer pays the bill at their bank the same way they pay their utility bill, which then results in a payment confirmation sent from the bank to the payee. Payment information from the bank is sent to the system manually by the service provider administrator using the Debit Manager interface or by running an automated batch process to update the purchase transactions. Once the payment information is processed, the consumer and merchant accounts are balanced and both receive automatic notification of the payment. The system also advises if underpayment or overpayment has been made. The system handles error scenarios during the processing of the transaction and notifies consumer, merchant or service providers with the necessary error codes and appropriate action that needs to be taken.

In accordance with an aspect of the present invention there is provided a payment processing system for facilitating payment for online purchase transactions comprising: a merchant interface, a messaging manager, a payment interface, an account settlement module, and a database. The merchant interface receives, from an online merchant, purchase transaction information related to an online purchase transaction by a consumer. The purchase transaction information includes merchant and consumer account identification, a transaction description, and a transaction amount related to the online purchase transaction. The purchase transaction information is independent confidential financial information pertaining to the consumer.

The messaging manager generates an electronic bill based on the received purchase transaction information. The electronic bill includes the transaction description, amount due, payment due date, and payee information to which payment for the online purchase is made at a financial institution trusted by the consumer thereby avoiding disclosure of the consumer's confidential financial information to the online merchant.

The payment interface receives, from the financial institution, payment information upon payment of the electronic bill by the consumer, and provides, to the online merchant and the consumer, a payment notification. The account settlement module processes parsed payment information and allocates payments to outstanding online purchase transactions. The database stores information pertaining to the online merchant, the consumer, and the electronic bills associated with the online purchase transactions.

In accordance with another aspect of the present invention there is provided a payment method for online purchase transactions. According to the method, purchase transaction information related to an online purchase transaction by a consumer is received from an online merchant. The purchase transaction information includes online merchant and consumer account identification, a transaction description, and a transaction amount related to the online purchase transaction. The purchase transaction information is independent of confidential financial information pertaining to the consumer.

An electronic bill based on the received purchase transaction information is generated and provided to the consumer. The electronic bill includes the transaction description, amount due, payment due date, and payee information to which payment for the online purchase is made at a financial institution trusted by the consumer, thereby avoiding disclosure of the consumer's confidential financial information to the online merchant. Payment information is received, from the financial institution, upon payment of the electronic bill by the consumer. Based on parsed payment information, payments are automatically allocated to outstanding online purchase transactions. The payments are routed to outstanding online purchase transactions based on data introspection according to predefined rules. The online merchant and the consumer are provided a payment notification. Information pertaining to the online merchant, the consumer, and the electronic bills associated with the online purchase transactions is stored in a database.

BRIEF DESCRIPTION OF THE DRAWINGS

The present invention will be further understood from the following detailed description with reference to the drawings in which.

DETAILED DESCRIPTION OF THE PREFERRED EMBODIMENT

Generally, the present invention provides a system and method for facilitating payment for online purchases. The system allows consumers/customers who shop online to select, at the time of checkout, direct payment from an account as the payment option. An electronic bill (ebill), independent of any confidential financial information pertaining to the consumer, is automatically displayed and emailed to the consumer. The consumer pays the ebill at their bank the same way they pay their utility bill, which then results in a payment confirmation sent from the bank to the payee. Payment information from the bank is sent to the system to update the purchase transactions. Once the payment information is processed, the consumer and merchant accounts are balanced and both receive automatic notification of the payment.

Figure 1:
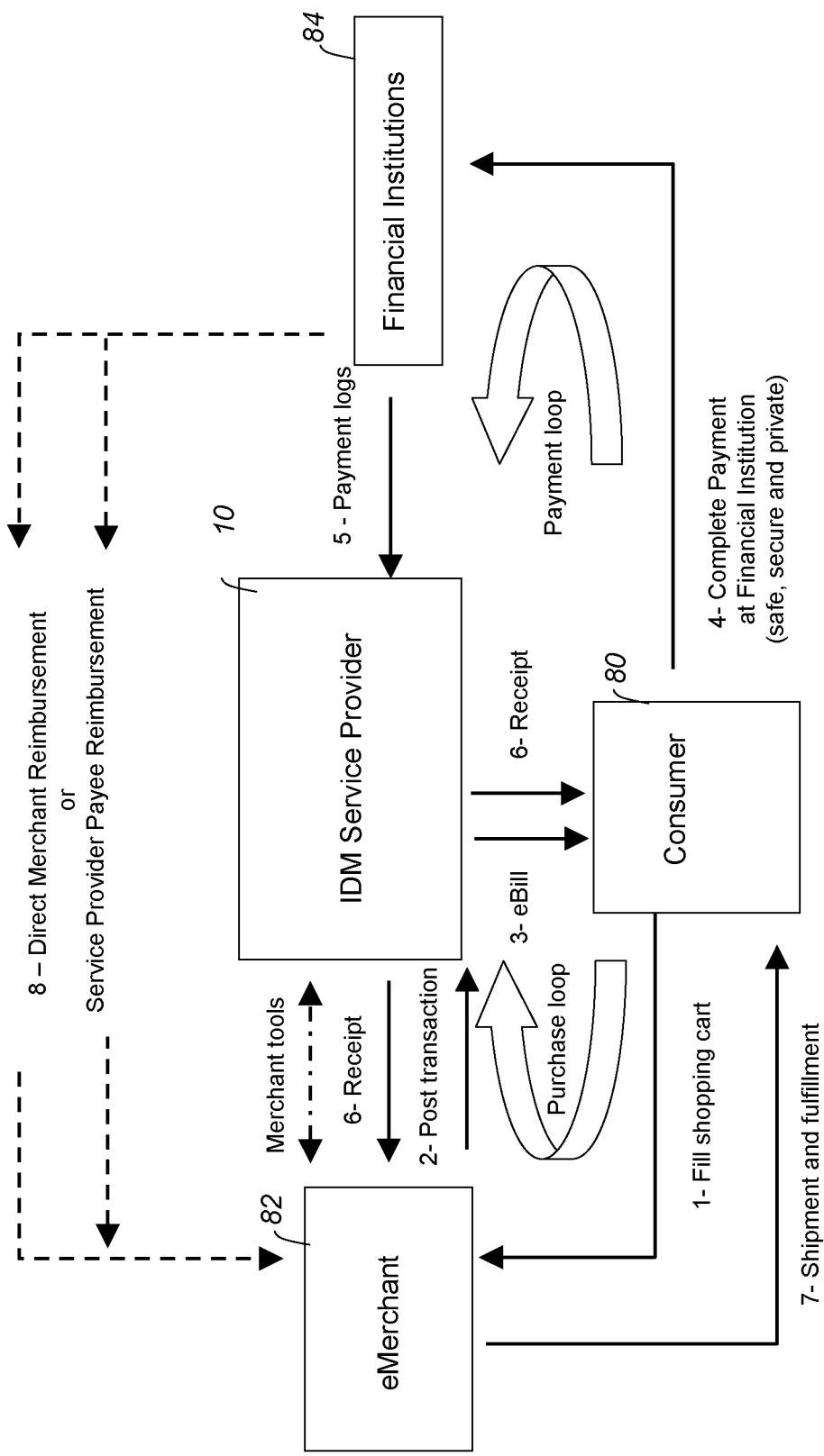
FIG. 1 illustrates a payment processing system in accordance with an embodiment of the present invention.

Referring to FIG. 1, there is illustrated a payment processing system in accordance with an embodiment of the present invention. The payment processing system or IDM service provider 10 facilitates payments for online purchases made by a user or consumer 80 at an online merchant 82. The IDM service provider 10 supports the online transaction during the purchase loop and the payment loop, as shown in FIG. 1 and described below.

As is typical in an online or e-commerce transaction, a consumer 80 accesses merchant web sites 82 via the Internet. The consumer 80 selects the goods and services they wish to purchase by filling a shopping cart (step 1). The merchant 82 displays a payment web page to the consumer 80 at checkout with one or more payment options, one of which includes the debit payment option according to an embodiment of the present invention. If the consumer 80 selects the debit payment option, the merchant 82 sends purchase details of the consumer's order to the IDM service provider 10 (step 2). The IDM service provider 10 then generates and provides an ebill to the consumer 80 showing, among other information, the order details, amount due, and due date along with instructions to the consumer 80 to make payment to the indicated payee using the payee's assigned account number at a financial institution 84 of the consumer's choice (step 3). The ebill is independent of any confidential financial information pertaining to the consumer.

Upon receipt of the ebill, the consumer 80 completes payment of the ebill at the chosen financial institution 84 (step 4). Once the financial institution 84 processes the payment, payment logs or information is sent to the IDM service provider 10 (step 5). The IDM service provider 10 processes the payment information and provides notification (receipt) of the payment to the merchant 82 and the consumer 80 (step 6). Shipment and fulfillment of the order occurs after receipt of notification of payment by the merchant 82 (step 7). The merchant 82 receives payment directly from the financial institution 84 or through the IDM service provider 10 (step 8).

The financial institution 84 (such as an RPPS—Remote Payment and Presentment Service or ePay) provides an existing infrastructure for payment or electronic funds transfer from a consumer's bank account to the IDM service provider or the online merchant's bank account using an online banking payment system (these accounts could be at the same institution or at different institutions). The financial institution network can be an existing remittance and payment-processing network for registered bill and consumer service providers (e.g., for utility companies).

Figure 2:
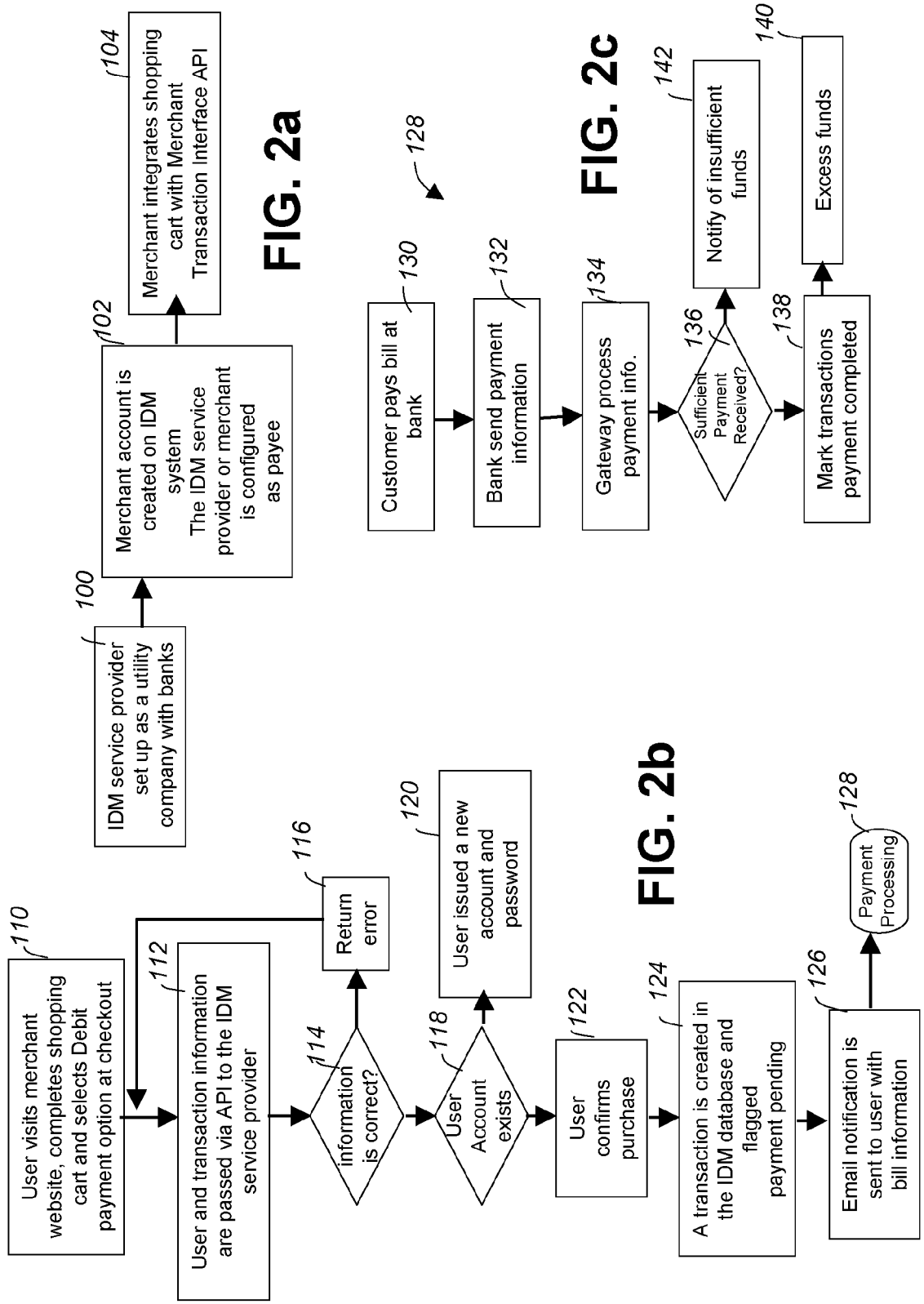
FIGS. 2a, 2b, and 2c are flow charts illustrating processes for set up, purchase and payment, respectively, for the system of FIG. 1 in accordance with an embodiment of the present invention.

FIGS. 2a, 2b, and 2c are flow charts illustrating processes for set up, purchase and payment for the system of FIG. 1 in accordance with an embodiment of the present invention. An online merchant 82 that wishes to offer web banking as a payment option (debit payment option) for online purchases of goods or services contacts the IDM service provider 10 to receive integration information. Once the registration form is completed, the information is setup on the IDM system database (to be described later) along with a unique account id and number identifying the merchant 82.

Prior to the purchase and payment process, the IDM service provider 10 and/or the online merchant 82 is set up as a payee with financial institutions, in accordance with an embodiment of the present invention, as shown in FIG. 2a. The IDM Service Provider 10 registers itself as a payment receiver with all major banks 84 (step 100). Alternatively, an online merchant account is created with the IDM service provider 10 and either the IDM service provider 10 or the online merchant 82 is registered as a payment receiver (payee) with the financial institutions 84 (step 102). This process is only performed once before the system is deployed. At the completion of this step any person or consumer 80 can visit their banks web page, mobile banking or telebanking and search for the payee name. Once the company information is displayed a user adds payee to their bill list. The online merchant 82 integrates their shopping cart (direct payment as check out option) with the IDM service provider 10 (step 104).

Currently all transaction processing software components are only capable of processing payments based on one account—one merchant basis. For example, each Utility Company creates an account number for each client or consumer, which limits the client to only pay that particular utility. The system according to the present invention leverages the existing banking infrastructure and improves it by allowing users to pay multiple merchants using one account through the IDM service provider.

FIG. 2b illustrates, in a flow chart, the purchase process in accordance with an embodiment of the present invention. The method provided enables merchants to accept debit payments for online purchases as follows. A user/consumer visits the merchant website and selects the goods or services they wish to purchase (step 110). Once the user decides to proceed to checkout and selects direct payment from account as the payment option the transaction information is posted to the IDM service provider system via the Merchant Integration Application Programming Interface API (to be described later) (Step 112).

Each Transaction includes the merchant identification and at least one purchase item. Each purchase item has a positive dollar value attached to it. The transaction also includes all mandatory fields and correct field formats as defined by the Merchant Integration API.

The information passed may include the payment occurrence indicating whether the transaction is a single payment or re-occurring payment and the type of the transaction, for example, Test or Live. For re-occurring payment the frequency of the payments is also passed to the IDM service provider system.

The information passed may include overdue account information indicating the terms of sales to be applied to overdue accounts. This information will be applied to any reminder bills generated. For example, a merchant may pass net "30, 1.5%, overdue reminder=yes". After thirty days if the account remains unpaid an ebill reminder will be sent including the 1.5% interest charges against the transaction.

The transaction information is checked for errors (step 114). Any errors detected are returned to the IDM service provider system or presented to the user (step 116). Either the user or the merchant's system administrator must correct the error in order to proceed with the purchase.

Verification is made as to whether an account exists for the user in the IDM service provider system. The consumer is then authenticated as a user of the payment system (step 118). If the consumer is a new user, an account is created and the consumer is provided their account information and password (step 120).

The consumer is displayed a confirmation page to accept the purchase order and consent to the direct (web banking) payment method (step 122). A transaction is created in the IDM service provider database and flagged as payment pending (step 124). All transaction information is tracked in the IDM service provider system, as discussed later.

An ebill is emailed to the consumer showing, among others, the order details, amount due, due date and instructing them to make payment to the payee using the payee's assigned account number at their own bank (step 126). The process now enters the payment loop (step 128) as illustrated in detail in FIG. 2c. As described earlier, the ebill is independent of any confidential financial information pertaining to the consumer.

FIG. 2c illustrates, in a flow chart, the payment process in accordance with an embodiment of the present invention. This method enables merchants to process bank payment notifications as follows. Consumers visit their banks online (or in person), and pay their bills, using the account number and amount specified in the ebill (step 130). The first time the user makes an online payment; they also add the payment receiver to the list of vendors in their bill list. Thus, payment for the online purchase is made at a financial institution trusted by the consumer thereby avoiding disclosure of the consumer's confidential financial information to the online merchant.

On a scheduled basis, the banks send the payment receiver, i.e., the IDM service provider or the merchant, an electronic feed for the transactions completed (step 132). Upon receipt of the payment information, the IDM service provider process the information either automatically or manually.

For automatic processing, the IDM service provider system receives the payment information files from the banks, parses them, extracts the data and populates the system database making the appropriate entries in the consumer account tables. The process also notifies the user that the payee received a payment and that further action is required on their part if they chose the manual payment processing option to complete the transaction.

For manual processing, such as for smaller operations, the bank feed can be received via fax and the database manually updated by an authorized administrator. The administrator will use the debit manager interface (to be described later) to enter account number and amount received from the bank. The system will then update the database records. The process also notifies the user that the payee received a payment and that further action is required on their part if they chose the manual payment processing option to complete the transaction.

Each consumer can choose to allocate funds manually or let the Account Settlement module process the payments in relation to one or more transactions, and route the payment to an order based on a matching algorithm. The matching algorithm performs data introspection according to predefined payment routing rules, for example, based on merchant operating needs. The matching algorithm can include any number of criteria and/or comparisons, on the basis of which the payment can be routed to one or more orders or transactions. Money can then be credited to each matching transaction and marked as Paid. Unpaid transactions retain their status as payment pending. The consumer account carries a balance if the were insufficient funds to cover the bill.

If the consumer chooses to allocate funds manually, then each time a payment is made at the bank, and the processing is completed by the system as outlined above, the consumer is sent an email and is asked to revisit the system and complete the transaction by allocating the funds appropriately. When the consumer logs into their Wallet (to be described below), they see a list of their outstanding transactions and account balance. The consumer manually allocates funds to each transaction. Transactions that have been completed successfully are marked as payment complete. The remaining balance is credited to the consumer's account; outstanding transactions remain as payment pending. Based on the transaction requirements, the consumer can only allocate full payment against any specific transactions; partial payment may not be accepted.

The system verifies if sufficient payment has been received (Step 136). If the consumer makes a decision to allocate the funds automatically, the Account Settlement module (to be described below) of the system will process the payments. For example, payments can be processed daily using the following three scenarios.

Scenario 1: The amount deposited equals the amount owing in the consumers account. In such a case all transactions are processed, and marked as payment completed (step 138).

Scenario 2: The amount paid is larger than the amount owing on the consumer account. In such a case all transactions are credited and their status is changed to payment competed. The remaining funds will remain in the consumers account and can be refunded or used at a later time to complete other payments against future transactions (step 140).

Scenario 3: If the money paid is less than the total amount owing on all transactions, then Account Settlement processes the transactions starting with the service that was purchased first, money is credited to each transaction and marked payment completed. Once the system determines that cash on hand is not sufficient to complete a transaction, the process stops. The remaining transactions retain their status as payment pending. The remaining funds stay in the users account. A transaction summary and account status is then emailed to the consumer (step 142).

The merchant has the option of sending reminder bills to consumers with over due accounts. The bill sent to the consumer may reflect the outstanding balance, and interest incurred and a total owing.

Figure 3:
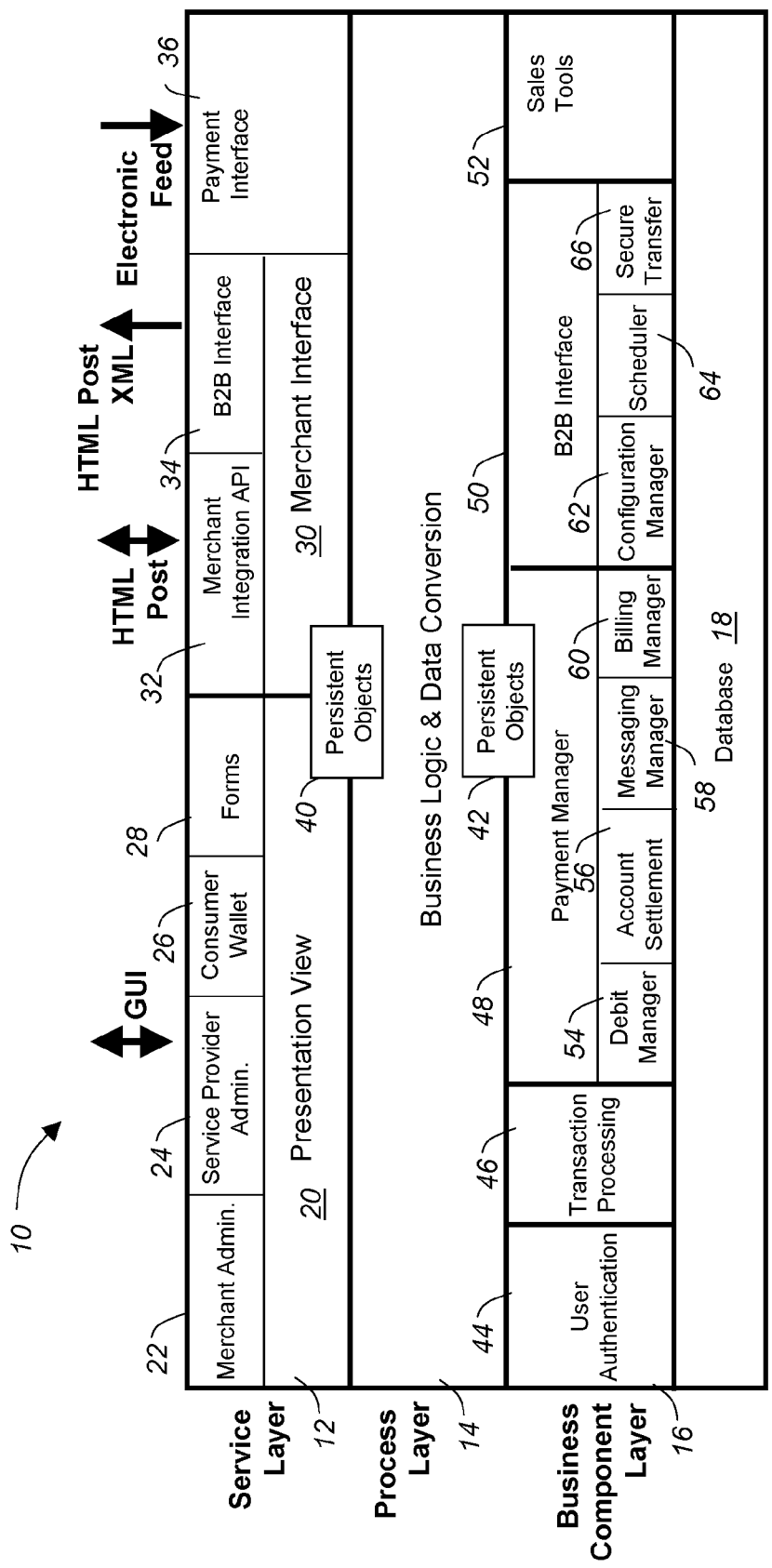
FIG. 3 illustrates a functional block diagram the modules of the system of FIG. 1 in accordance with an embodiment of the present invention.
Figure 4:
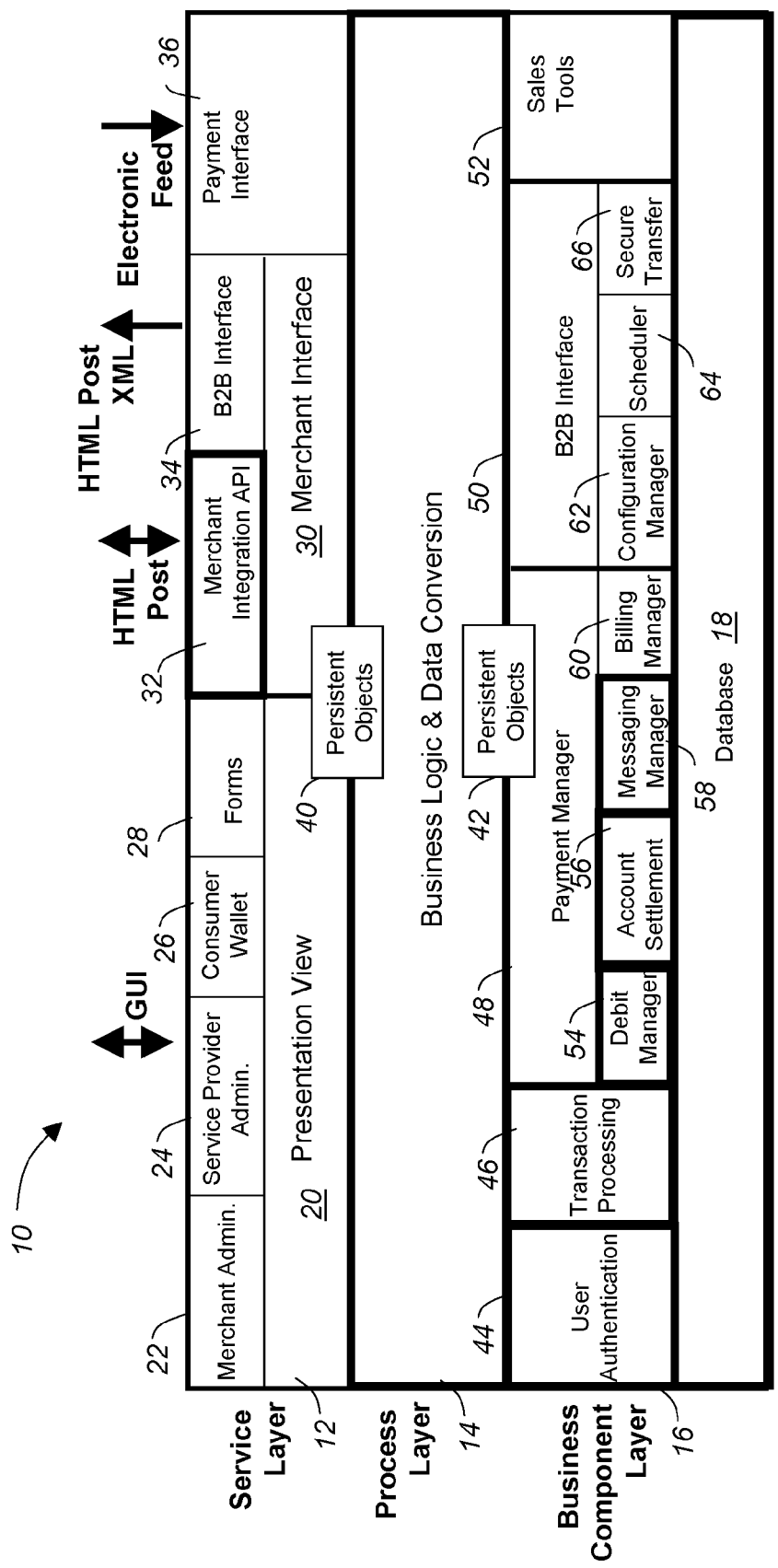
FIG. 4 illustrates, in bold, the modules of the system of FIG. 1 used to process a purchase transaction in accordance with an embodiment of the present invention.

The IDM system will now be described in further detail with reference to FIG. 3. FIG. 3 illustrates, in a functional block diagram, the on-line direct debit payment system in accordance with an embodiment of the present invention. The The modules of the system 10 that interact to process a purchase transaction are shown in FIG. 4. The modules include the merchant integration API module 32, the user authentication module 44, the transaction processing module 46, the debit manager module 54, the account settlement module 56, and the messaging manager module 58.

The Merchant Integration API 32 receives information in an HTML post, XML or client server secure interface. The information includes the merchant identification and at least one purchase item. Each purchase item has a positive dollar value attached to it. The transaction also includes all mandatory fields and correct field formats as defined by the Merchant Integration API 32.

The general format of the purchase information passed to the IDM system in the HTML post is shown below as an example:

```
<form action=https://www.modasolutions.com/MODAPay/ ProcessPayment " method="POST">
    <input type=hidden name=merchant_id value="MP0001">
    <input type=hidden name=item_name_1 value="computer">
    <input type=hidden name=item_desc_1 value="DELL Dimension">
    <input type=hidden name=item_amount_1 value="1400">
    <input type=hidden name=item_quantity_1 value="1">
    <input type=hidden name=item_name_2 value="Monitor">
    <input type=hidden name=item_desc_2 value="Samsung 14" LCD">
    <input type=hidden name=item_amount_2 value="1400">
    <input type=hidden name=item_quantity_2 value="1">
    <input type=hidden name=item_count value="2">
    <input type=hidden name=currency value="CAD">
    <input type=hidden name=cmd value="_mTrans">
</form>
``` system 10 includes a Service Layer 12, Process Layer 14 and Business Components Layer 16 that communicate with a database 18.

The service layer 12 includes a presentation view 20 having a merchant administration module 22, a service provider administration module 24, a consumer wallet 26 and a forms module 28. The service layer 12 also includes a merchant interface 30 having a merchant integration API module 32, a service layer business-to-business (B2B) interface 34. The service layer also includes a payment interface 36.

The process layer 14 includes business logic and data conversion and shares persistent objects 40 and 42 with the service layer 12 and business component layer 16, respectively. The process layer 14 acts as a messenger between the service layer 12 and business component layer 16. It takes requests from service layer 12, performs first level validations on inputs, does data conversion on the inputs and passes it on to the business component layer 16 for further validations and data storage functions. The process layer 14 takes responses from the business component layer 16 and passes it to the service layer 12 in the appropriate formats.

The business component layer 16 includes a user authentication module 44, a transaction processing module 46, a payment manager module 48, a business component B2B interface 50 and a sales tool module 52. The payment manager 48 includes a debit manager module 54, an account settlement module 56, a messaging manager module 58 and a billing manager 60. The business component B2B interface 50 includes a configuration manager 62, a scheduler 64 and a secure transfer module 66.

Referring to FIG. 4, there is illustrated, in bold, the modules of the system 10 of FIG. 3 used to process a purchase transaction in accordance with an embodiment of the present invention.

The system 10 is capable of processing single or recurring payment. For recurring payments the frequency of the payments is also passed to the system 10. The payment schedule is stored in the database 18. The billing manager 60 is invoked periodically and searches due bills and sends the information to the messaging manager 58 to prepare and deliver the necessary bills to the user or consumer 80. For single billing, the transaction process invokes the billing manager 60 in real-time.

The system 10 is capable of managing overdue accounts. To enable this feature the information passed includes overdue account information indicating the terms of sales to be applied to overdue accounts. The billing manager 60 applies this information to any reminder bills generated. For example, a merchant may pass net "30, 1.5%, overdue reminder=yes". After thirty days if the account remains unpaid, an ebill reminder will be sent including the 1.5% interest charges against the transaction.

System generated errors are returned to the system or presented to the user. Either the user or the merchant's system administrator must correct the error in order to proceed with the purchase.

The system 10 includes a User Authentication or Verification Module 44. Prior to the system 10 committing a sales transaction to the database 18, the consumer information is passed to the user authentication module 44. If the consumer is a new user the user authentication module 44 of the system 10 creates an account, the system returns the account and password information for the consumer to accept.

The system is also capable of receiving bulk purchase information in a batch process. This information is passed through the Merchant Interface 30 to the system via HTML or XML. The system processes batch purchases the same way it processes individual requests made to the Merchant Integration API 32.

Figure 5:
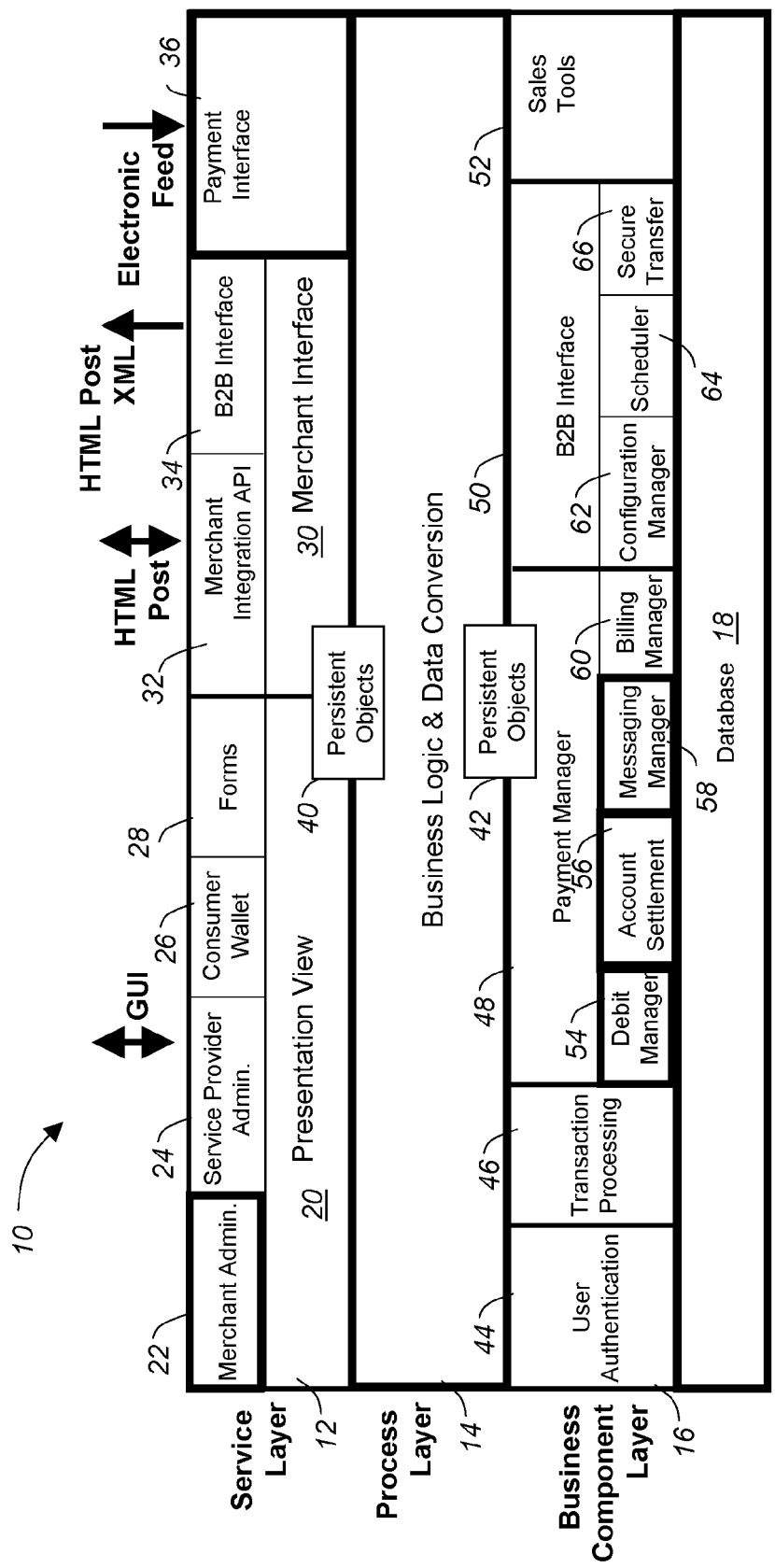
FIG. 5 illustrates, in bold, the modules of the system of FIG. 1 used to process a payment transaction in accordance with an embodiment of the present invention.

Referring to FIG. 5, there is illustrated, in bold, the modules of the system 10 of FIG. 3 used to process a payment transaction in accordance with an embodiment of the present invention.

The modules of the system that interact to process a payment transaction are shown in FIG. 5, in bold. These modules include the merchant administration module 22, the payment interface 36, the process layer 14, the debit manager module 54, the account settlement module 56, the messaging manager module 58 and the database 18.

In one embodiment, the payment information is received electronically and is processed by the system 10. The Payment Interface 36 receives payment information in an electronic feed from the banks. The Payment Interface 36 may be configured to receive the files and information in different formats to accommodate different banks. The payment interface 36 parses the information to ensure that it is in the pre-defined bank format. For example, ACH format on the RPPS network. The parsing of the information may be triggered manually through the merchant administration view 22 or scheduled to run at different intervals.

All generated errors are written to a log file. The errors must be corrected in order to proceed with the processing of the payment file.

The Account Settlement module 56 processes all valid payment transactions by extracting the data and populating the database 18. The account settlement module 56 processes parsed payment information and allocates payments to outstanding online purchase transactions. The system is capable of managing correct payments, overpayment and underpayment. The transactions are processed as follows:

When the amount received equals the amount owing in the consumers account all transactions are processed, and marked as Paid.

When the amount received is larger than the amount owing on the consumer account all transactions are credited and their status is changed to Paid. The account balance will reflect the unused portion of the amount received.

When the amount received is less than the total amount owing on all transactions, the Account Settlement module 56 processes the payment in relation to one or more transactions, and routes the payment to an order based on a payment matching algorithm. The payment-matching algorithm includes steps to perform data introspection according to predefined rules defined, such as rules based on merchant operating needs. The matching algorithm can include any number of criteria and/or comparisons, on the basis of which the payment can be routed to one or more orders or transactions. Money can then be credited to each matching transaction and marked as Paid. Unpaid transactions retain their status as payment pending. The consumer account carries a balance if the were insufficient funds to cover the bill.

The payment process triggers the Messaging Manager module 58 to notify the user that a payment has been received, the status of the account and if further action is required on their part to complete the transaction.

In a second embodiment, the payment information is received by fax and entered into the system manually. The transactions are manually typed into the Debit Manager 54 by entering the account number and amount received from the bank. The system 10 then processes the transactions the same way it processes the electronic feeds.

Figure 6:
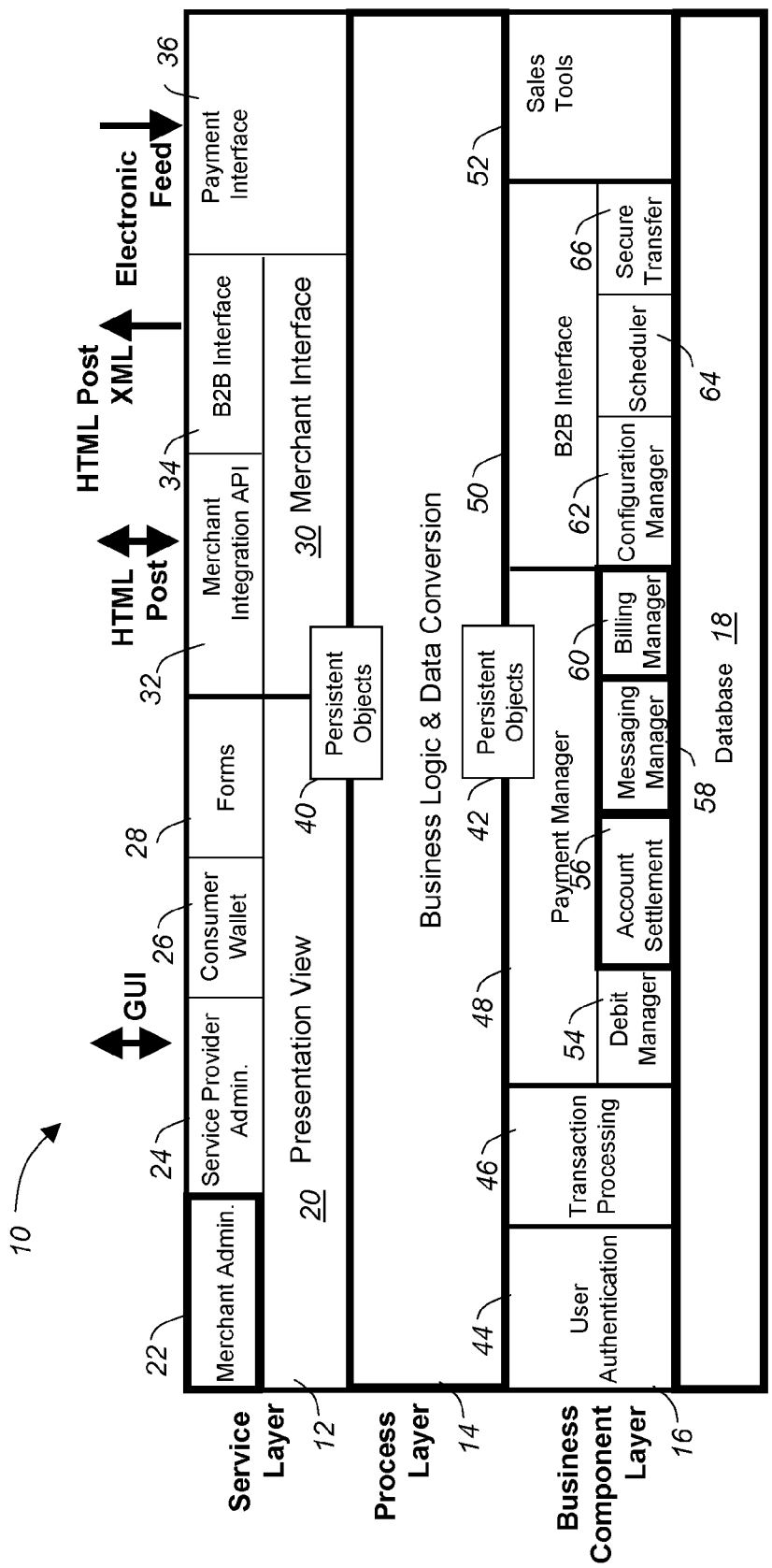
FIG. 6 illustrates, in bold, the modules of the system of FIG. 1 used to send a message in accordance with an embodiment of the present invention.

Referring to FIG. 6, there is illustrated, in bold, the modules of the system 10 of FIG. 3 used to send a message in accordance with an embodiment of the present invention.

As shown in FIG. 6 the messaging manager 58 receives system calls from the Merchant Interface 30, Account Settlement module 56 and Billing Scheduler/Manager 60 to trigger the sending of a message.

The system call includes parameters such as message type, message format, preconfigured account number and transaction reference number. Based on these parameters the message manager 58 queries the database 18 for the content of the message.

The type of messages generated by the messaging manager 58 are, typically, ebill, Payment Reminder, Payment Received, Over Payment, Insufficient Payment, Coupons, and Order Cancellation or Amendment. The content of each of the messages may be system default or composed using the merchant interface 30 and stored in the database 18. The automatic sending of a message may be suppressed. The messaging manager 58 sends email, or messages in SMS and MMS formats.

An embodiment of the invention further includes a method of facilitating consumers to manage their account funds using the Consumer Wallet 26 in an Internet browser. The Consumer Wallet 26 queries the database 18 to present a history of transactions, a list of outstanding transactions and the account balance. Available funds can be allocated to unpaid bills and the Account Settlement module 56 updates the database 18. Bills that have been completed successfully are marked as Paid. The remaining balance is credited to the consumers account; outstanding transactions remain as payment pending.

Using a GUI interface a consumer can choose to allocate funds manually or configure the Account Settlement 56 module to allocate money on their behalf using a payment matching algorithm, such as First in first out (FIFO) system. When the "Allocate Funds Manually" option is enabled, each time a payment transaction is processed the Messaging Manager 58 sends the consumer an email instructing the consumer to log on to the system to complete the transaction by allocating the funds appropriately.

The system 10 includes a module known as the Service Provider Administration Tool 24. Service Provider Tools 24 enable service providers to offer the system as a service to their merchant base. The Service Provider Administration is an application accessed through an Internet browser that allows authorized administrators to view and manage the information pertaining to their merchants, transactions billing, and merchant reimbursements stored in the database 18.

The Service Provider Administration Tools 24 provide the following functionality: view, search, sort, and edit merchant account information belonging to that service provider; setup and tear down merchant accounts; view, search, sort transaction information generated by their merchants; view, search, sort consumer account information; generate merchant statements; and reconcile settlement with merchants.

The Service Provider Administration Tools 24 also allow service providers to retrieve records of all payments received for a specified period of time and to flag transaction records as "reimbursed" when payments of funds have been reimbursed to the merchants.

The system 10 includes a module known as the Merchant Administration Tools 22. The Merchant Administration Tools 22 is an application accessed through an Internet browser that allows authorized administrators to view and manage the information stored in the database 18.

The Merchant Administration Tools 22 provide the following functionality: view, search, sort, and edit consumer account information belonging to that merchant; setup and tear down merchant accounts; view, search, sort transaction information generated by their consumer; perform bill adjustments; view, search, sort consumer account information; generate consumer statements; generate and configure message manager; and reconcile settlement with payees.

The Merchant Administration Tools 22 also allow merchants to retrieve records of all payments received for a specified period of time and to retrieve records of all payments reimbursed by the payee for a specified period of time.

In addition, Merchant Tools such as sales closing tools enable merchants to send various notifications as follows.

Systems notifications—enable merchants to select default system generated emails to be sent to buyers. As an example, the merchant can select a "Thank you for buying" email that is sent to consumers who paid directly. Another example is when merchant can send a "reminder to pay" email for those with payment pending status Merchant defined notifications—enables merchants to compose and send emails to buyers who completed their payments or people who have not paid yet. These emails are typically not predefined and can be written by the merchant and may include the opportunity for cross-selling or up selling. The system supports text-based emails and formatted based ones.

Wireless SMS/MMS Systems notifications—enables merchants to select predefined system generated SMS or MMS messages to be sent to buyers on their mobile phones. As an example, the merchant can select a "Thank you for buying" SMS that is sent to consumers who paid directly. Another example is when merchant can send a "reminder to pay" SMS/MMS for those with payment pending status.

Wireless merchant defined notifications—enables merchants to compose and send SMS or MMS messages to buyers who completed their payments or people who have not paid yet. These emails are typically not predefined and can be written by the merchant and may include the opportunity for cross-selling or up selling.

In an embodiment of the system 10, the merchant administration enables merchants to make adjustments to existing bills. The bill adjustment includes bill presentment to the administrator and the functions to perform order cancellations, item cancellation, and item modifications. Adjustments to orders can trigger the account settlement module 56 to make the required changes to the consumer account when billing is affected. The message manager 58 can be automatically or manually invoked to send notification of the change to the consumer.

Another embodiment of the invention includes a system for generating and settling coupons. The system comprises of an interface to create and manage the coupons, a database to store coupon details and the method that enables merchants to send coupons once the ebill has been received by the buyer. The coupon contains the consumer account and the discount amount that is applied to a purchase or left in the account for future purchases. The coupon management interface accepts individual coupons or batch loading of coupons into the system. When a payment is processed the Account Settlement module 56 searches the database 18 for coupons that are linked to the consumer account and applies the discount to settle the account balance.

Coupon issuing enables merchants to send coupons once the buyer has received the ebill. The coupon can include discounts that can be used to reduce payments or a credit that can be left in account for future purchases.

In an exemplary scenario, below is a walkthrough of how coupon issuing can work. A buyer fills a shopping cart, checks out and selects direct payment from bank account. The buyer then receives an ebill by email with the payment amount specified in the ebill. The merchant uses the couponing tools to issue a $100 discount coupon. The coupon can be issued at the same time the ebill is emailed or sent by the merchant at a later time to motivate the buyer to complete payment. Upon receiving the coupon, the buyer pays for entire amount less than the $100 coupon. The system processes transaction and matches the transaction with the account and settles the account.

Coupon creation and distribution module enables a coupon to be created via the web manually and sent via email to the buyer; a coupon to be created via the web manually and sent via SMS/MMS to the buyer; a batch of coupons to be uploaded to the system and sent to buyers by email; a batch of coupons to be uploaded to the system and sent to buyers by SMS/MMS; and enables the merchant to define a credit coupon or a discount coupon.

Discount coupons can be applied against an outstanding bill. Credit coupons can be applied any time after the coupon is issued.

The Coupon Processing module enables the system to store, track, and process coupons sent to the buyer. The module maps coupon numbers to an account number held by the buyer. The module enables discounts coupons to be matched against outstanding bills. On processing of transactions the number of coupons are matched against the ebill amount. The module enables credit coupons to be added to the buyer's account. The system processes the credit coupons and updates the balance in the buyer's account.

Yet another embodiment of the system includes enabling merchants to define the payment schedule for recurring payments. The payment schedule can be defined on a weekly, monthly, or quarterly basis. The method enables merchants to track the number of recurring payments completed by the buyer. For example, merchant can view the administrator reports and determine that consumer x has completed 3 out of 7 payments. The merchant can also have the option to utilize any of the resources available by the system such as notifications and coupons.

Another embodiment of the system includes enabling the merchants to use Leasing Tools to break down the amount of a transaction into multiple smaller amounts. An example of this scenario is as follows: A merchant sells $1000 computers, which a buyer wants to buy but cannot afford the full amount. The buyer agrees for the merchant's leasing program and selects leasing terms. The system sets up transaction as a recurring payment transaction and manages the ebills, the interest on the leasing as well as the conditions and policies in the event of a non-payment.

Figure 7:
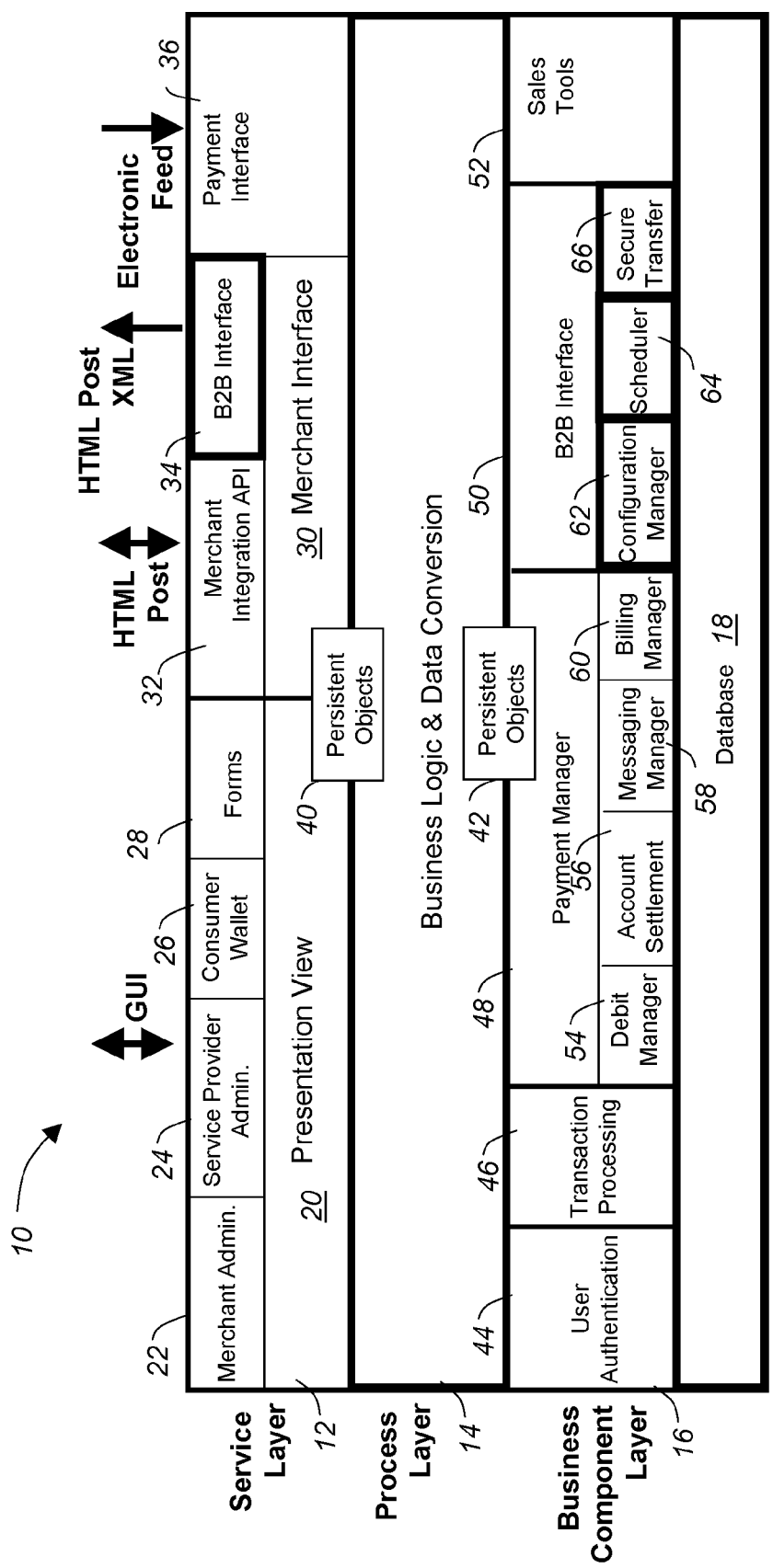
FIG. 7 illustrates, in bold, the modules of the system of FIG. 1 used to provide business to business transactions in accordance with an embodiment of the present invention.

Referring to FIG. 7, there is illustrated, in bold, the modules of the system 10 of FIG. 3 used to provide business-to-business transactions in accordance with an embodiment of the present invention.

The system 10 includes a module known as the business component B2B Interface 50 that interfaces on the backend with third party applications such as sales order processing and accounting systems residing in the merchants' premises. The order processing information is exported off the system over an HTML or XML service layer B2B interface 34. As shown in FIG. 7 the business component B2B Interface includes three components viz., Configuration Module 62; Scheduler Module 64; and Secure Transfer Module 66.

The configuration module 62 is used to record in the database 18 the batch processing triggers, information to be transmitted, interface destination, output formats and error handling destination.

The scheduler 64 runs to invoke the secure transfer of the order information on a scheduled basis. The secure transfer module 66 establishes a secure link with the host destination. A file is created and the information is transferred to the host destination.

Figure 8:
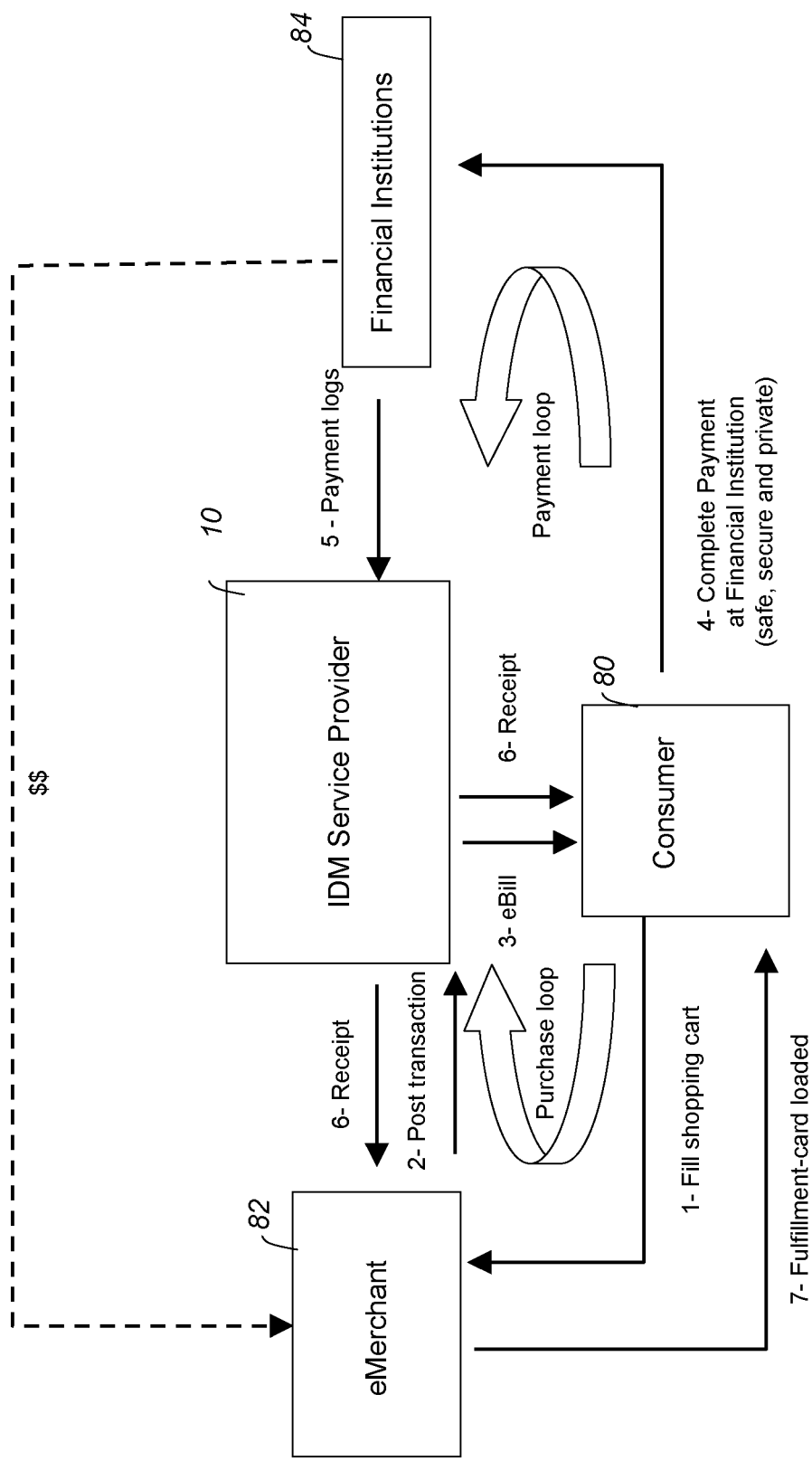
FIG. 8 illustrates an alternate embodiment of the system of FIG. 1 for Internet card loading.

Referring to FIG. 8, there is illustrated communication with the system of FIG. 3 for Internet card loading in accordance with an embodiment of the present invention. Internet Card Loading is a method that enables merchants and consumer acquirers to load prepaid value cards using the IDM system. The stored value cards could be one of the following: prepaid credit cards; prepaid phone cards used for land line/mobile telephony; prepaid value cards run and owned by the provider of the IDM system.

In an exemplary embodiment, as illustrated in the FIG. 8, the following steps highlight the functionality of the Internet Card Loading operation. A user 80 visits merchant site 82 that is selling prepaid cards. The user selects card, and the amount of money to be loaded and subsequently receives an ebill. The user pays the ebill at their bank account using the pre-assigned account number. The funds are now allocated in the user's account. The system 10 maps the account number to the prepaid card number. The mapping enables prepaid card to be used as desired by the user 80.

The Internet loading can happen in multiple possible configurations. For example, the merchant 82 assigns an account to the consumer 80 and maps the IDM account to the prepaid cards. Alternatively, the merchant 82 configures the system 10 to issue accounts that are equivalent to the prepaid cars. Once the account is loaded, there is no need for mapping between multiple accounts to be made.

In summary, purchase processing supports an API to accept user authentication information and purchase transaction details from a shopping cart or other web application such as an invoicing or event management application. Purchase processing also enables posting of transaction information to the IDM database, and triggers electronic bill delivery and electronic receipt delivery.

Payment processing allows processing by batch or individually of bank payment logs. Payment processing also allows consumers to allocate funds to purchases as desired when multiple pending payments exist. Processed payments can trigger automatic notification of incomplete payment, over payment and full payment received.

Merchant tools allow merchants to view, search and sort transactions, manage sales transactions, export data from the IDM system, generate notification and marketing messages over SMS, email, MMS or instant messaging, generate coupons, and create pre-assigned consumer accounts.

Service Provider Tools allows administrators to view, create and maintain merchant and user accounts and settle merchant reimbursements.

It is contemplated that each merchant may assign one or more administrators to maintain support of the system and to track and manage transactions. All administrators are given access to a sophisticated reporting and management tool.

A merchant can have two options for system interface based on their level of sophistication and size of business. The merchant can use web banking with IDM Service Provider online order form 28 or integrate web banking with shopping cart software using the Merchant Integration API, as shown in Step 104 of FIG. 2*a*.

The merchant can choose to be the payee or chose the service provider to be the payee. When the merchant is the payee, the consumers will make their bill payments directly to the merchant via their bank and the bank will pay the merchant. When the service provider is chosen to be the payee, the consumer will make their bill payments to service provider via their bank. The bank will pay the Service Provider, which will then reimburse the merchants.

The system can also include a default or configurable "Checkout" button. This graphic and text can be inserted in HTML web pages, emails or electronic documents to enable buyers to select the direct pay at my bank option. The pre-configured/default option includes presentation and text.

It is also contemplated that the system 10 can support embedded payments in direct marketing campaigns. The system enables merchants to preauthorize prospective buyers and send them marketing campaigns that include pre-assigned account numbers that enable the buyer to pay for the items enclosed in the campaign. In an exemplary embodiment, the merchant compiles list of potential prospects and sends campaign to the list with details of product/service in the body of the email. The system assigns a predefined account number to the buyer. The buyer receives email, reads information and then decides to pay using the pre-defined account for merchant's product/service. The Buyer can click on a button that routes to a pre-filled form in which the user reviews information and then confirms a request for an ebill if payment has not been made to the pre-defined account. The user then carries on with the payment process as defined throughout this document. In the alternative, the buyer has the opportunity to proceed and pay from their bank account to the pre-defined account number without requesting an ebill.

Enterprise Deployment: It is contemplated that the system 10 can be supported as a software license that can be hosted on the web or deployed at the consumer premise behind a firewall. A software license with installable tools to be deployed on standalone redundant servers and has all the modules to support direct payment from bank account.

Backend interfaces enable merchants to pull data from the IDM system via a XML interface; Proprietary interface; and Email. The backend interfaces also enable the IDM to push the data via a XML interface or Installable software at merchant premise that retrieves data from the system and presents it on the screen. The data from IDM containing information deposited in the database and passed to the system through the frontend interface includes, among other information, transaction details; payment status; sales closing information; and coupon usage information.

Another embodiment extends the system to mobile phones, wireless devices, and PDAs that enables the purchase loop and the payment loop to be executed on a mobile device. In the form of an installable software module on a mobile device with menus and functionality that enables buyer to complete purchase and or payment loop on their mobile device and to manage their account status, payments and profiles.

Wireless adaptation enables merchants to offer web-banking payments for purchases completed from a wireless device.

The IDM engine can be built using any CGI Web enabled programming language, along with any data storage facilities. For example, JAVA, JSP, xHTML, Oracle can be used to build the engine. There are several classes and database tables required to implement this engine. Also there are shell scripts and EDI used to transfer and extract the data between the banks and IDM.

The IDM interface is also available for immediate use by clients with access to an IP enabled mobile phones. Since IDM wired interface is written using xHTML the translation to a wireless devise is instantaneous and requires minimal code modifications The IDM interface can also be developed to accommodate mobile devices that require a mobile interface. For this purpose IDM can be supported using different technologies such as J2ME Web services, ASP.NET, Python and other technologies.

The mobile device can use navigation where a user can easily allocate funds using their mobile towards their IDM account. Once the payment is received by the IDM the data is processed in the same manner as before. An email is sent out as well as an SMS message (if client is set up with the service) instructing the client to allocate payments towards the transactions. The Wireless banking module is then invoked from the main menu, where a user is then displayed the balance in their account and a list of transactions that are pending. The user can then select each item and hit the enter button on their phone. Once the button is selected, the appropriate tables are updated and the corresponding emails and SMS/MMS messages are sent.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A payment processing system for facilitating payment for online purchase transactions comprising:
    a merchant interface to receive, from an online merchant, purchase transaction information related to an online purchase transaction by a consumer, the purchase transaction information including merchant identification, payment processing system account identification for the consumer, a transaction description, and a transaction amount related to the online purchase transaction, the purchase transaction information being independent of confidential financial information pertaining to the consumer;
    an electronic bill manager to generate an electronic bill based on the received purchase transaction information and send the electronic bill to the consumer, the electronic bill including the transaction description, amount due, payment due date, and payee information specifying the payment processing system as a payee to which payment for the online purchase is made at a financial institution trusted by the consumer thereby avoiding disclosure of the consumer's confidential financial information to the online merchant and the payment processing system;
    a payment interface to receive, from the financial institution, payment information indicating the consumer has directed the financial institution to pay the electronic bill in favor of the payee, and to provide, to the online merchant and the consumer, a payment notification;
    an account settlement module to process parsed payment information and to allocate payments to outstanding online purchase transactions from an account of the payment processing system to appropriate online merchants; and
    a database, to store information pertaining to the online merchant, the consumer, and the electronic bills associated with the online purchase transactions.

2. The payment processing system as claimed in claim 1, further comprising:
    a user verification module to verify the existence of an account related to the consumer in the database based on the payment processing system account identification for the consumer and to create a consumer account in the absence of an existing consumer account prior to generating the electronic bill.

3. The payment processing system as claimed in claim 2, wherein the merchant interface provides error notifications to the online merchant or the consumer for correction prior to generating the electronic bill.

4. The payment processing system as claimed in claim 1, further comprising:
    a billing manager to provide overdue payment and recurring billing information in accordance with a billing schedule to the electronic bill manager to generate overdue and recurring electronic bills.

5. The payment processing system as claimed in claim 1, wherein the payment interface provides the payment notification through the electronic bill manager.

6. The payment processing system as claimed in claim 1, wherein the payment interface receives payment information electronically from the financial institutions or through manual data entry into a debit manager.

7. The payment processing system as claimed in claim 1, wherein the payment interface parses the payment information, upon automatic or manual trigger, to provide the payment notification and to update the database.

8. The payment processing system as claimed in claim 1, further comprising a consumer wallet module to facilitate management of the consumer account by the consumer.

9. The payment processing system as claimed in claim 8, wherein the account settlement module allocates payments to outstanding online purchase transactions automatically or as manually allocated by the consumer through the consumer wallet.

10. The payment processing system as claimed in claim 9, wherein the payment interface provides, to the consumer and to the online merchant, a payment complete, an over payment or an insufficient payment notification for outstanding online purchase transactions upon allocation of payments.

11. The payment processing system as claimed in claim 9, further comprising a coupon interface module to generate online coupons for use against pending or future online purchase transactions and to send the coupons to the consumer via the electronic bill manager.

12. The payment processing system as claimed in claim 11, wherein the account settlement module matches coupons against pending online transactions and allocates payments in conjunction with the terms of the coupons.

13. The payment processing system as claimed in claim 9, further comprising a leasing tool to manage leasing options for online purchase transactions.

14. The payment processing system as claimed in claim 13, wherein the account settlement module allocates payments in conjunction with the leasing option associated with the online purchase transaction.

15. The payment processing system as claimed in claim 1, further comprising a service provider administration tool to allow authorized service providers to view and manage information pertaining to one or more online merchants.

16. The payment processing system as claimed in claim 15, further comprising business to business interface to interface with third-party applications residing in the online merchant or service provider premises.

17. The payment processing system as claimed in claim 1, further comprising a merchant administration tool to allow the online merchants to view and manage information pertaining to themselves and their consumers.

18. The payment processing system as claimed in claim 17, wherein the merchant administration tool allows the online merchants to modify or delete pending online purchase transactions.

19. The payment processing system as claimed in claim 1 wherein the account settlement module routes payments to a plurality of transaction for which payment is pending.

20. The payment processing system as claimed in claim 1 wherein the payment processing system is configured to register itself as a payee with a plurality of financial institutions.

* * * * *